US011188640B1

(12) United States Patent
Powell et al.

(10) Patent No.: US 11,188,640 B1
(45) Date of Patent: Nov. 30, 2021

(54) PLATFORM FIRMWARE ISOLATION (71) Applicant: Advanced Micro Devices, Inc., Santa Clara, CA (US)

(72) Inventors: Jeremy W Powell, Austin, TX (US); David A Kaplan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 472 days.

(21) Appl. No.: 16/110,329

(22) Filed: Aug. 23, 2018

(51) Int. Cl.
| G06F 17/00 | (2019.01) |
| H04L 29/06 | (2006.01) |
| G06F 21/53 | (2013.01) |
| G06F 21/74 | (2013.01) |
| G06F 21/57 | (2013.01) |
| G06F 21/60 | (2013.01) |

(52) U.S. Cl.
CPC ............ *G06F 21/53* (2013.01); *G06F 21/572* (2013.01); *G06F 21/60* (2013.01); *G06F 21/74* (2013.01); *G06F 2221/2141* (2013.01); *G06F 2221/2149* (2013.01)

(58) Field of Classification Search
CPC .......... G06F 21/50; G06F 21/53; G06F 21/55; G06F 21/567; G06F 21/572; G06F 21/60; G06F 21/70; G06F 21/74; G06F 2221/2149; G06F 2221/2141
See application file for complete search history.

(56) References Cited

U.S. PATENT DOCUMENTS

| 5,978,903 | A  | * | 11/1999 | Quimby | G06F 12/0623 711/209 |
| 6,571,206 | B1 | * | 5/2003  | Casano | G06F 9/45537 703/25 |
| 7,165,135 | B1 | * | 1/2007  | Christie | G06F 21/74 710/269 |
| 9,817,975 | B2 | * | 11/2017 | Liu | G06F 21/554 |
| 2014/0258700 | A1 | * | 9/2014 | England | G06F 21/51 713/2 |
| 2014/0289570 | A1 | * | 9/2014 | Lewis | G06F 11/3089 714/43 |
| 2017/0012981 | A1 | * | 1/2017 | Obaidi | H04L 63/102 |
| 2018/0276146 | A1 | * | 9/2018 | Dover | G06F 3/0622 |
| 2020/0380133 | A1 | * | 12/2020 | Xia | G06F 21/57 |

* cited by examiner

*Primary Examiner* — Amie C. Lin
(74) *Attorney, Agent, or Firm* — Liang & Cheng, PC (57) ABSTRACT A method includes establishing an isolated execution environment for executing a platform firmware operating mode subroutine in a platform firmware operating mode. In response to receiving an interrupt, the platform firmware operating mode subroutine is executed in the isolated execution environment. In response to detecting an attempted access of a hardware resource resulting from execution of the platform firmware operating mode subroutine, the attempted access is blocked when the attempted access violates a security policy.

20 Claims, 4 Drawing Sheets

PLATFORM FIRMWARE ISOLATION

BACKGROUND

Modern computing system platforms commonly include one or more operating modes in which routines are executed in platform firmware. Operations performed in these platform firmware operating modes are often transparent to other processes being executed in the computing system, and are often used to configure system hardware devices such as power controllers, peripheral devices, etc. One example of a platform firmware operating mode is System Management Mode (SMM), which is a highly privileged operating mode that is available on x86 central processing unit (CPU) architectures. In an x86 processor, SMM is invoked by a system management interrupt (SMI), which interrupts normal operation of the computing system in order to perform the hardware configuration or other system management tasks. SMM is intended to be used by system firmware (e.g., the computer's Basic Input/Output System (BIOS)), rather than the operating system or application software; thus, the SMM code is stored in a protected region of memory that is accessible to the system firmware and not to the operating system or processes running in other operating modes of the processor.

A substantial body of existing software relies on established firmware operating modes such as SMM; however, because software operating within these modes is highly privileged, they are commonly targeted by malicious actors in order to observe or affect the execution of the operating system. An improved computing system in which certain of the vulnerabilities in platform firmware operating modes are addressed (while maintaining compatibility with existing software) and is better secured against malicious code is described herein.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

In one embodiment, a platform firmware operating mode in a computing system is capable of operating with a high level of privilege. For example, system management mode (SMM) in an x86 processor has the highest level of privilege in an x86 system. Platform firmware operating modes such as SMM are often used when executing code provided by an original equipment manufacturer (e.g., the manufacturer of a personal computer, laptop, server, etc.) in order to configure hardware devices attached to the computing system. However, this use of platform firmware to configure hardware devices can interfere with attempts by the operating system to configure or control the same hardware. For example, an operating system can configure a particular hardware device for future use; however, code executed in the platform firmware is capable of transparently changing the configuration of the device before the device is used by the operating system. Errors can occur if the operating system then relies on its original configuration.

Malicious actors also target platform firmware operating modes for exploitation. Due to the high privilege level afforded to software run in such operating modes, malicious code run in these modes is capable of observing or affecting the execution of the operating system unimpeded. Existing firmware-based solutions for impeding attacks directed to platform firmware may not completely eliminate the risk and/or provide a sufficient level of robustness in all circumstances. Furthermore, fully malicious code operates at a high enough level of privilege that it may be able to disable or circumvent existing solutions under certain circumstances.

In one embodiment, isolation of a platform firmware operating mode in a computing system eliminates or significantly reduces the threat of malicious attacks executing within the firmware operating mode. The isolation is implemented by using hardware to intercept and block dangerous actions. Code executed in the platform firmware operating mode is isolated from the system hardware resources by the processing unit. The processing unit enforces a predetermined security policy on any platform firmware subroutines to prevent unauthorized access to hardware by the platform firmware. In one embodiment, unauthorized actions cause the processing unit to halt execution of the platform firmware subroutine that performed the action or is to perform an action that is unauthorized, and the unauthorized action is handled by an appropriate corrective action initiated by the processing unit. In one embodiment, the processing unit also reflects the security violation back to the platform firmware subroutine as an exception, to be handled by the platform firmware subroutine. This approach for isolating operations performed in the platform firmware subroutine prevents malicious or misconfigured software from observing or negatively impacting the execution of other software, such as the operating system. Software executing in the platform firmware subroutine is prevented, according to a validated security policy, from accessing sensitive system registers or hardware resources that are owned by the operating system. Accordingly, isolation of the platform firmware operating mode reduces the operating system's exposure to risk of harm due to vulnerabilities in the platform firmware.

Figure 1:
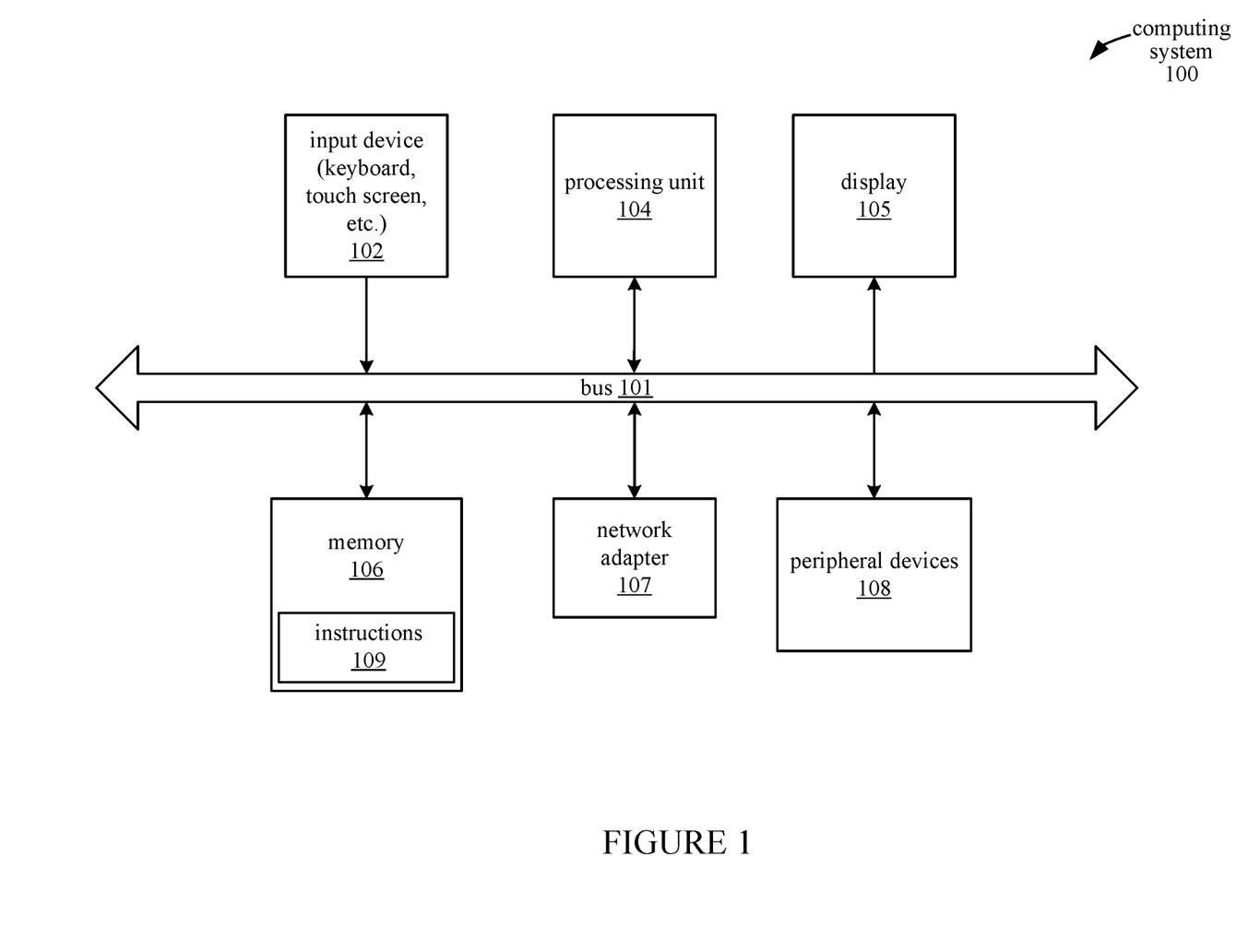
FIG. 1 illustrates a computing system, according to an embodiment.

FIG. 1 illustrates an embodiment of a computing system 100 in which routines operating in a platform firmware operating mode are isolated. In general, the computing system 100 is embodied as any of a number of different types of devices, including but not limited to a laptop or desktop computer, mobile device, server, network switch or router, etc. The computing system 100 includes a number of hardware resources, including components 102-108, which communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as external peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes a processing unit 104. The processing unit 104 receives and executes instructions 109 that are stored in a memory system 106. In one embodiment, the processing unit 104 includes multiple processing cores that reside on a common integrated circuit substrate. Memory system 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple processing units 104, buses 101, network adapters 107, memory systems 106, etc.

Figure 2:
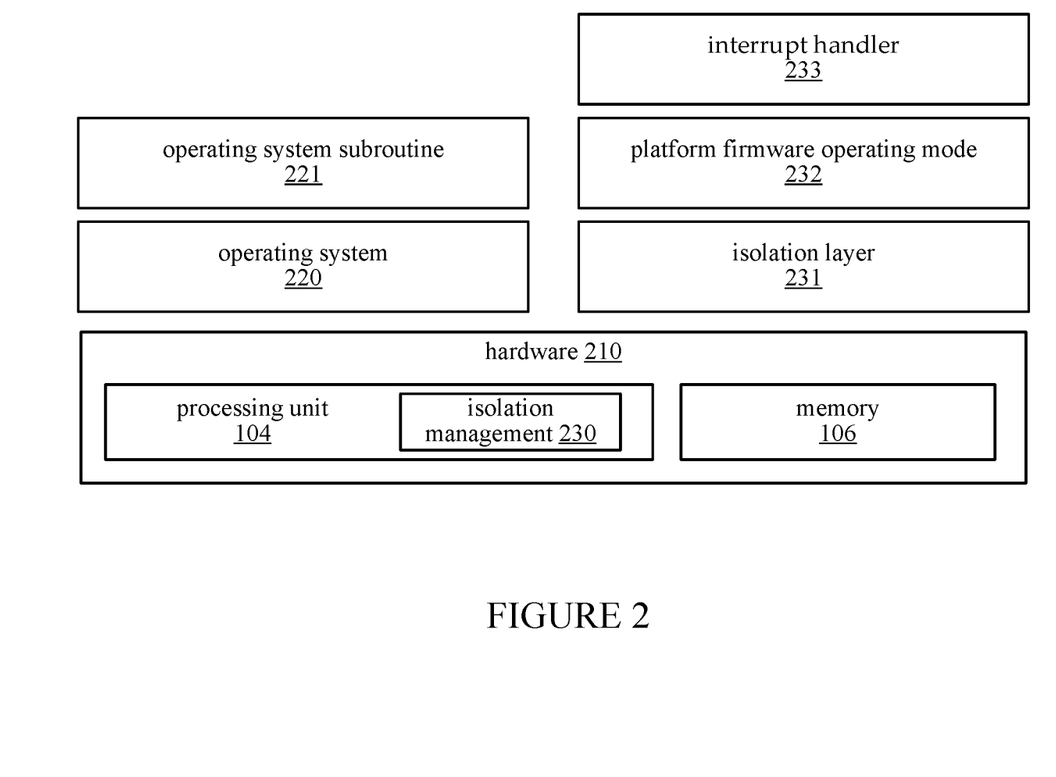
FIG. 2 is a stack diagram illustrating a hierarchy of control between components in a computing system, according to an embodiment.

FIG. 2 illustrates a stack diagram representing a computing environment in which subroutines executed in a platform firmware operating mode (e.g., SMM) are isolated from system hardware devices, according to an embodiment. As illustrated in FIG. 2, the hardware 210 includes at least the processing unit 104 and memory 106 of the computing system 100, and can also include other components of the computing system 100.

In FIG. 2, each element in the stack is able to assert control over the elements above it. During normal operation, the operating system subroutine 221 is executed under control of the operating system 220. The subroutine 221 represents, for example, instructions executed by a user-facing application such as a word processor, web browser, email client, etc. When the processing unit 104 receives an interrupt (e.g., a system management interrupt) during execution of the subroutine 221, any routines being executed by the processing unit 104, such as the operating system 220 and subroutine 221, are halted so that the interrupt can be handled.

In one embodiment, a platform firmware operating mode subroutine that is executed in the platform firmware operating mode 232 is an interrupt handler 233 that handles the interrupt. For executing the interrupt handler 233, the isolation management circuitry 230 in the processing unit 104 sets up the platform firmware operating mode 232 in an isolated execution environment by instantiating the isolation layer 231. The interrupt handler 233 is executed in the isolated platform firmware operating mode 232. Any access to hardware 210 by the interrupt handler is provided through the isolation layer 231, which is controlled by the processing unit 104. During execution of the interrupt handler 233, if the interrupt handler 233 attempts to access any hardware resources 210 in violation of a security policy enforced by the processing unit 104, then the processing unit 104 prevents the access from occurring. In some cases, the processing unit 104 also performs some corrective action, such as resetting the system or creating an exception.

Figure 3:
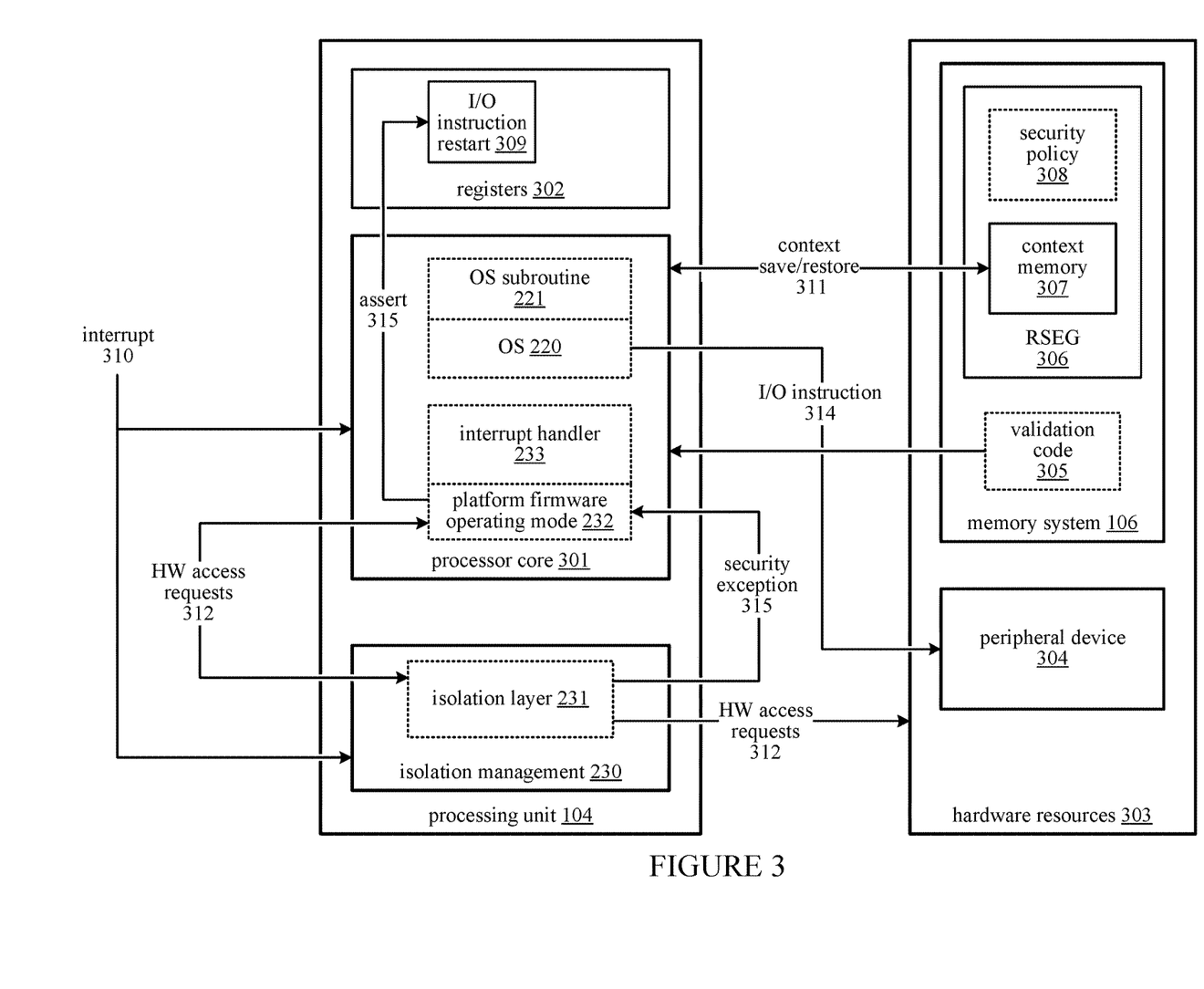
FIG. 3 is a block diagram illustrating components of a computing system, according to an embodiment.

FIG. 3 illustrates a portion of the computing system 100 that isolates platform firmware operating mode operations using an isolation layer under the control of a processing unit, according to an embodiment. In one embodiment, the processing unit 104 in the computing system 100 includes an x86 processor core 301 that supports one or more platform firmware operating modes, such as SMM. In the computing system 100, isolation of any of the one or more platform firmware operating modes is enabled by assertion of a corresponding processor flag. For example, isolation of the SMM is enabled by asserting the flag SMMISO_ENABLE.

When isolation is enabled for a platform firmware operating mode 232, processes executed in the platform firmware operating mode 232 are isolated from hardware resources 303 in the system 100 according to a predetermined security policy 308. The security policy 308 lists a set of accessible hardware resources in the computing system 100 that routines executed in the platform firmware operating mode 232 are allowed to access, and indicates a level of access (e.g., read or write) that is permitted for each of the listed hardware resources. In one embodiment, the specific hardware resources to which the platform firmware operating mode 232 is allowed access is determined by an original equipment manufacturer (OEM) having knowledge of which hardware in the system is configured by or controlled by processes operating in platform firmware operating mode 232. For example, if a particular computing system 100 includes a security processor, fingerprint reader, or other peripheral devices that are configured or used by platform firmware operating mode 232 subroutines, then these hardware resources are listed in the security policy 308 along with their access permissions. The security policy 308 also specifies amounts of memory (e.g., 8 megabytes of system memory) and/or specific regions of memory that the platform firmware operating mode 232 is allowed to use for executing code.

The security policy 308 is stored in a protected memory region RSEG 306, which is a physically contiguous region of memory in the memory system 106 that is enabled with platform firmware operating mode isolation. When activated, the RSEG region 306 cannot be written to by software in any processor mode, but can be read by software in any processor mode. The RSEG region 306 is used by firmware in the computing system 100 to store data structures for configuring and operating the isolation mechanism, which are protected from being modified by the platform firmware operating mode 232, operating system 220, and any other software.

The RSEG protected memory region 306 is writable during a limited initialization period following a power-on reset of the system 100. After the initialization period has elapsed, modification of data in the RSEG region 306 by any software process is prevented. In one embodiment, a flag is asserted after the initialization period has elapsed to indicate that the RSEG region 306 cannot be written by software. After the initialization period has elapsed, the RSEG region 306 cannot be modified by any software process until another initialization period following a subsequent power-on reset of the system 100.

At boot time, the list of hardware resources that are accessible to platform firmware operating mode 232 processes is created and written to the RSEG region 306 during the initialization period, when the RSEG region 306 is writable by software. Once the security policy 308 is established and the RSEG region 306 is protected from modification, the security policy 308 is committed until the next power-on reset and associated initialization period. That is, the committed security policy 308 is enforced against the platform firmware operating mode 232 at least until the next power-on reset.

In one embodiment, the operating system 220 validates the security policy 308 and other data structures for configuring and operating the isolation mechanism, which are stored in the RSEG region 306. The validation of the security policy 308 is performed by the processor core 301 executing the validation code 305 as a subroutine in the operating system 220. The operating system 220 reads the security policy 308 to ensure that there is no conflict between access permissions for the platform firmware operating mode 232 indicated in the security policy 308 and access permissions belonging to the operating system 220 for any hardware resources (e.g., devices, memory ranges, etc.); that is, the operating system 220 confirms that the platform firmware operating mode 232 is not improperly allowed access to hardware resources that should be protected from access by platform firmware operating mode 232 processes. For example, if the operating system 220 relies on exclusive control of a particular hardware resource, the operating system 220 reads the security policy 308 to confirm that the platform firmware operating mode 232 is not also allowed access to the resource.

In addition to checking for conflicts, the operating system 220 also determines whether the platform firmware operating mode 232 has a sufficient level of access (e.g., read or write access) to particular hardware resources for the system 100 to function properly, as indicated in the security policy 308. For example, the operating system 220 in one embodiment establishes a runtime buffer that allows the operating system 220 to pass information to and receive information from processes executing in platform firmware operating mode 232. Accordingly, during the validation of the security policy 308, the operating system 220 confirms whether the platform firmware operating mode 232 is granted read and write access to the memory range for the buffer. In one embodiment, the operating system 220 validates the security policy 308 in response to a power-on reset of the system 100 (e.g., when the operating system 220 is started), periodically during normal operation of the system 100, in response to a system event, and/or due to other conditions.

If the system 100 is already compromised such that malicious code is able to run in the platform firmware operating mode 232, the code 305 for performing the validation of the security policy 308 could be altered to report that a compromised security policy 308 (or other data structure) is valid. Accordingly, the operating system 220 authenticates the validation code 305 using an authentication procedure prior to executing the code 305. In one embodiment, the authentication procedure is a Dynamic Root of Trust for Measurement (DRTM) procedure, which provides assurance to the operating system 220 that validation code 305 is executed in its original unaltered state. During the DRTM procedure, the processing unit 104 is configured to a known state, and other processes executing in the processing unit 104 are paused so that none of these other processes (including platform firmware operating mode 232 and operating system 220 processes) are able to affect the execution of the validation code 305 being run under DRTM. In one embodiment, execution of the validation code 305 occurs at the time the operating system 220 is launched.

The validation of the security policy 308 fails if the security policy 308 grants permissions to the platform firmware operating mode 232 that it should not have, or fails to grant permissions to the platform firmware operating mode 232 that it should have, as determined by the operating system 220. If the validation of the security policy fails, the operating system 220 performs a corrective action, which can include halting the system 100, partially restricting access to portions of the system 100 (e.g., disabling access to one or more hardware components), displaying a notification to user or transmitting a notification to another computer (e.g., an audit service), etc. If the security policy 308 is successfully validated, then the policy 308 is committed and enforced against the platform firmware operating mode 232 whenever the platform firmware operating mode 232 is entered. In some embodiments, the security policy 308 is committed and enforced before the operating system 220 begins executing. In that case, the operating system 220 chooses whether to continue executing, given the security policy 308 that has been installed.

As an example, in an embodiment of a computing system 100 that includes an encrypted hard disk, the operating system 220 makes sure that the system 100 is secure prior to decrypting the hard disk and exposing its contents. As part of this security check, the operating system 220 executes the validation code 305 to read and validate the security policy 308. If the validation fails, the operating system 220 does not decrypt the hard disk, and thus prevents its contents from being potentially exposed to malicious code. If the validation is successful, the hard disk is decrypted, with the assurance that the correct security policy 308 is being enforced against any processes executing in platform firmware operating mode 232 for the protection of the decrypted contents.

In the processor core 301, the platform firmware operating mode 232 is initiated in response to receiving an interrupt 310 at the processor core 301. For example, the interrupt 310 can be a system management interrupt (SMI) that is received asynchronously from a hardware device (e.g., a hard disk, peripheral device, etc.), and is asserted at the processing unit 104 and received in the processor core 301. Code being executed in the processor core 301 is also capable of generating the interrupt 310 by writing a byte to a special port specified by firmware (e.g., port 0B2h is commonly used for triggering SMIs).

If the interrupt 310 is received while the processor core 301 is executing an operating system (OS) subroutine 221 (e.g., operating system code, user-facing application code, etc.) under the control of operating system 220, the processor core 301 responds to the interrupt 310 by interrupting the execution of the OS subroutine 221 in the processor core 301, then executing an interrupt handler 233 in platform firmware operating mode 232 for handling the interrupt 310.

In one embodiment, the processing unit 104 includes isolation management circuitry 230 on the same integrated circuit substrate as the processor core 301 or in the same integrated circuit package as the processing core 301. The isolation management circuitry 230 receives the interrupt 310; when the interrupt 310 is triggered, the isolation management circuitry 230 initiates an isolation layer 231. The isolation management circuitry 230 causes a context 311 to be saved for the OS subroutine 221 being interrupted. The context 311 records the state of processor switches, registers 302, and any other memory being used by code executing in the processor core 301 (e.g., the OS subroutine 221) at the time it is interrupted. The saved context 311 is stored in a context memory 307 in the memory system 106 prior to invoking the platform firmware operating mode 232.

In one embodiment, if isolation is enabled, then the saved processor state in context 311 is isolated from the platform firmware operating mode 232 processes. When isolation is enabled, processor state is removed from any memory locations that platform firmware operating mode 232 processes are allowed to access according to the security policy 308. The context 311 is saved to context memory 307 in a protected memory region RSEG 306 that is protected from modification by any processes operating in the platform firmware operating mode 232 by the security policy 308, instead of being saved in a memory region that is not protected from the platform firmware operating mode 232. When the context 311 is saved in the protected RSEG 306 memory, any interrupt handler 233 running in platform firmware operating mode 232 is unable to modify the saved processor state, and is thus prevented from affecting the operation of the processing unit 104 when the context 311 is later restored.

In response to the interrupt 310, the isolation management circuitry 230 also establishes an isolated execution environment for the platform firmware operating mode 232. The isolation management circuitry 230 instantiates the isolation layer 231 for executing the interrupt handler 233 in the platform firmware operating mode 232. By maintaining the isolation layer 231 between the platform firmware operating mode 232 processes and the physical hardware resources 303, the interrupt handler 233 executing in platform firmware operating mode 232 appears, from the viewpoint of the interrupt handler 233, to have highly privileged access to the hardware resources 303. However, the isolation management circuitry 230 controls the isolation layer 231 and thus retains ultimate control over access to the hardware resources 303. Requests 312 from processes executed in platform firmware operating mode 232 to access hardware resources in the system 100 are passed through the isolation layer 231 or blocked according to the access permissions in the security policy 308. The isolation management circuitry 230 thus presents to processes in the platform firmware operating mode 232 a view of the system 100 that includes only memory and hardware resources that the platform firmware operating mode 232 is allowed to access.

The interrupt handler 233 is executed in platform firmware operating mode 232 and addresses the interrupt 310 by performing some corrective action for remedying the condition that caused the interrupt 310. For example, if the interrupt 310 was caused by hardware misconfiguration, the interrupt handler reconfigures the hardware. The interrupt handler 233 finishes when it executes a 'resume' instruction; for example, the Resume from SMM (RSM) instruction is used when exiting an SMI handler executing in SMM in x86 processors. The resume instruction returns program control from the platform firmware operating mode 232 to the operating system subroutine 221 that was previously interrupted by the interrupt 310. The isolation management circuitry 230 deconstructs the isolation layer 231 and restores the processing unit 104 to its prior state from the time it was interrupted.

The state of the processing unit 104 is restored from the context 311 that was previously saved upon entering platform firmware operating mode 232. The processing unit 104 checks the context 311 being restored and if the processor detects invalid state information in the context 311 during state restoration, it enters a shutdown state to prevent potentially harmful or malicious code from being executed. When the context 311 is successfully restored, the subroutine 221 that was previously interrupted resumes execution with the restored context. The process of handling the interrupt 310 (including starting the isolation layer 231, setting up the platform firmware operating mode 232 environment, and executing the interrupt handler 233 to completion) is thus transparent to the interrupted subroutine 221.

As an example, the isolation mechanism is used when handling an interrupt 310 caused by failure of an input/output (I/O) instruction issued from the operating system 220. For example, an I/O instruction 314 issued to peripheral device 304 fails if the peripheral device 304 is in a low power consumption sleep state when the I/O instruction 314 is issued; this triggers the interrupt 310. In response to the interrupt 310, a context 311 is saved to preserve the state of processing unit 104 while the interrupt 310 is being handled. The isolation management circuitry 230 instantiates the isolation layer 231, and the interrupt handler 233 is executed in the platform firmware operating mode 232. The interrupt handler 233 corrects the cause of the interrupt 310 by waking the peripheral device 304 to a state in which the device 304 is ready to receive the I/O instruction 314.

Since the original I/O instruction 314 failed and triggered the interrupt 310, the I/O instruction 314 is executed again after interrupt handler 233 wakes the peripheral device 304 to ensure that the transaction is completed. Writing to the I/O instruction restart register 309 causes the trapped I/O instruction 314 to be executed again. The I/O instruction restart register 309 is asserted 315 by the interrupt handler 233 handling the interrupt 310. Accordingly, the security policy 308 indicates that processes executing in platform firmware operating mode 232 are allowed to write to the I/O instruction restart register 309. Thus, when the interrupt handler 233 attempts to write to the register 309, the isolation management circuitry 230 allows the write to occur. Since the security policy 308 defines which registers can be read and/or written to from platform firmware operating mode 232, mechanisms such as I/O instruction restart which rely on designated registers are enabled or disabled in the security policy 308 by granting access to these registers to the platform firmware operating mode 232.

After the interrupt handler 233 has finished, the isolation layer 231 is deconstructed and the context 311 is restored. The processor core 301 resumes execution of the operating system subroutine 221 that was previously interrupted by the interrupt 310. Since the I/O instruction restart register 309 has been asserted by the interrupt handler 233, the I/O instruction 314 that was previously trapped is issued again and properly received by the peripheral device 304.

While in the platform firmware operating mode 232, if the interrupt handler 233 attempts to access a hardware resource, then the isolation management circuitry 230 checks the security policy 308 to determine whether the hardware resource is excluded from the set of accessible hardware resources indicated in the security policy 308. If the security policy 308 indicates that the platform firmware operating mode 232 does not have access to the hardware resource, then the attempted access violates the security policy 308. In response to the violation, the isolation management circuitry 230 blocks the attempted access by intercepting the instruction to access the protected hardware resource.

After the isolation management circuitry 230 intercepts the security violation, the processor core 301 continues execution of the interrupt handler 233 in the platform firmware operating mode 232. In one embodiment, the isolation management circuitry 230 additionally communicates a security exception 315 (e.g., #SX in x86 architectures) to the interrupt handler 233, which notifies the interrupt handler 233 that the access attempt caused a security violation. The interrupt handler 233 responds to the security exception 315 by executing its own code for handling the security exception. In some cases, the interrupt handler 233 can recover gracefully (e.g., by using substitute data in lieu of data that could not be accessed). In other cases, the interrupt handler 233 cannot continue and exits and/or causes the system 100 to reset. Ideally, the security policy 308 is designed so that platform firmware operating mode 232 processes are granted permissions for every hardware resource they would ever attempt to access. Thus, for an uncompromised system in which the security policy is properly designed, security exceptions will be rare.

After the completion of the interrupt handler 233, whether the interrupt handler 233 gracefully exits or is terminated by an unrecoverable security exception, the isolation management circuitry 230 deconstructs the isolation layer 231 and causes the previously saved context 311 to be restored. Then, the processor core 301 resumes execution of the operating system subroutine 221 that was previously interrupted by the interrupt 310.

In one embodiment, the platform firmware isolation mechanism enforces the security policy 308 using functionality provided by hardware virtualization circuitry in the processing unit 104. Accordingly, the isolation management circuitry 230 includes some circuitry that is also used for implementing hardware virtualization in such embodiments. For example, the saving and restoring of context 311 (including register state generated by the OS subroutine 221) when entering and exiting the platform firmware operating mode is performed by hardware virtualization circuitry that similarly saves register state when starting or exiting a virtual machine.

Hardware is also shared between the platform firmware isolation mechanism and hardware virtualization mechanisms for blocking unauthorized access to processor registers 302 and I/O ports for hardware resources 303. In particular, hardware virtualization circuitry implements a mechanism for determining whether to intercept register or port access instructions. Accordingly, this part of the hardware virtualization circuitry also functions as part of the isolation management circuitry 230 when determining whether register or I/O port access instructions executed by the interrupt handler 233 are authorized by the security policy 308 or blocked.

The platform firmware isolation mechanism is also capable of blocking unauthorized memory access by the interrupt handler 233. In one embodiment, virtualization hardware for setting up nested page tables functions as part of the isolation management circuitry 230 to allow blocking of access to memory with page granularity and in a manner that is transparent to interrupt handler 233. Nested page tables are used to effect a second level of memory address translation, and are thus used to present an arbitrarily flexible view of memory (e.g., mapping only authorized memory regions) to processes operating in the platform firmware operating mode 232. Attempts by the interrupt handler 233 to access memory that is not mapped by the nested page tables causes an exception to be raised (similar to a page fault exception) indicating that the attempted access is unauthorized.

Figure 4:
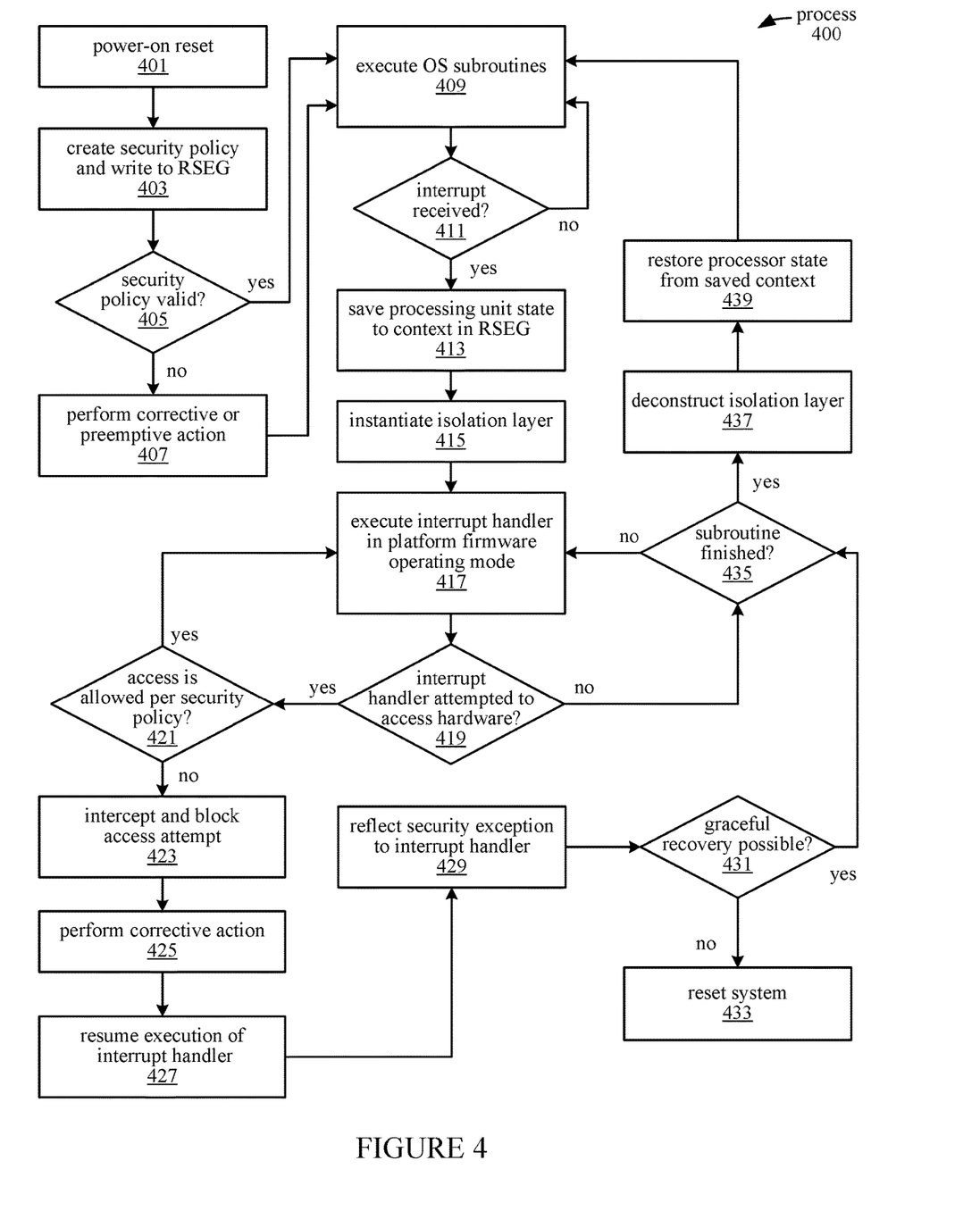
FIG. 4 is a flow diagram illustrating a process for isolating operations performed in platform firmware operating mode in a computing system, according to an embodiment.

FIG. 4 illustrates a process 400 for operating a computing system 100 in which operations executed in a platform firmware operating mode are isolated, according to an embodiment. The process 400 is performed by components in the computing system 100, including the processing unit 104 and hardware resources 303.

At block 401, a power-on reset occurs in response to power being supplied to the computing system 100. After a power-on reset, the processing unit 104 creates a security policy 308, as provided at block 403, and writes the security policy 308 to a protected memory region RSEG 306.

The security policy 308 indicates an access permission for each hardware resource in a set of hardware resources of the computing system 100. In one embodiment, the security policy 308 does not enumerate every hardware resource in the computing system 100, but lists hardware resources to which the platform firmware operating mode 232 is granted full or limited access. Hardware resources to which the platform firmware operating mode 232 has no access are excluded from the security policy 308. The set of accessible hardware resources listed in the security policy includes hardware resources such as regions of memory in the memory system 106, peripheral devices (e.g., peripheral device 304), registers (e.g., I/O instruction restart register 309, etc.)

The processing unit 104 stores the security policy in the protected RSEG memory region 306 during an initialization period following the power-on reset, when the protected memory region 306 is writable by software processes. After the initialization period has elapsed, a bit is asserted that prevents modification of data stored in the protected memory region. The bit remains asserted (during which time the RSEG memory region 306 is not writable by software processes) until a subsequent initialization period after a subsequent power-on reset of the processing unit 104.

At block 405, the processor core 301 executes validation code 305 under control of the operating system 220 to validate the security policy 308. The validation code 305 is authenticated by a DRTM procedure to ensure that the validation process is not compromised by malicious code operating in platform firmware operating mode 232 or any other highly privileged mode. The validation of the security policy 308 verifies that the platform firmware operating mode 232 is not granted permissions that conflict with access permissions (e.g., exclusive access rights) of the operating system 220, and that processes operating in platform firmware operating mode 232 are granted sufficient rights for the hardware resources they are expected to manage.

At block 405, if the security policy 308 is not successfully validated (i.e., the access permissions are incorrectly set in the security policy 308), the process 400 continues at block 407. At block 407, the processor core 301 performs some corrective or preemptive action in response to the failure to successfully validate the security policy 308, such as logging the failure, notifying a user of the computing system 100, restricting access to certain hardware resources, etc. For example, the operating system 220 in one embodiment prevents decryption of an encrypted hard disk when the security policy 308 is not successfully validated, thus preventing the contents of the hard disk from being exposed to potentially malicious code. In one embodiment, the process 400 continues from block 407 to block 409, when the corrective or preemptive action does not prevent continued operation of the computing system 100. Alternatively, if the corrective or preemptive action prevents further operation of the computing system (e.g., when access to critical hardware is prevented) then the system 100 resets or shuts down instead of proceeding to block 409. At block 405, if the security policy 308 is successfully validated, then the process 400 continues at block 409 without any corrective or preemptive action as provided at block 407.

At block 409, the processor core 301 executes one or more operating system subroutines 221 under control of the operating system 220. The operating system subroutines 221 communicate with the hardware resources 303 in the system 100 by issuing I/O instructions, such as I/O instruction 314.

At block 411, if an interrupt 310 has not been received at the processing unit 104, the process 400 returns to block 409. The process 400 thus repeats blocks 409 and 411 while an interrupt 310 has not been triggered. Accordingly, the processor core 301 continues executing the operating system subroutines 221 until the interrupt 310 is received. In one embodiment, an interrupt 310 is triggered by I/O instructions issued by an operating system subroutine 221 via the operating system 220. For example, if an I/O instruction 314 addresses communication to a peripheral device 304 that is unable to receive the communication (e.g., due to a low power state), the I/O instruction fails, causing the interrupt 310 to be triggered. Alternatively, an interrupt 310 can be triggered by other types of system events. In one embodiment, the operating system subroutine 221 is capable of being interrupted by an interrupt that is triggered independently from any actions of the operating system 220 or operating system subroutine 221. For example, an SMI can be triggered periodically based on a regular timer without any action on the part of the operating system 220. At block 411, if the interrupt 310 is received at the processing unit 104, the process 400 continues at block 413.

The interrupt 310 interrupts the operating system subroutine 221 and initiates a procedure for entering platform firmware operating mode 232. At block 413, the state of the processing unit 104 is saved in a context 311. The saved context 311 reflects the state of the registers and memory generated by the subroutine 221 that was interrupted. Data generated by the subroutine 221 residing in registers and other memory that is accessible to the platform firmware operating mode 232 (according to the security policy 308) is removed to memory that is not accessible to the platform firmware operating mode 232. Accordingly, the context 311 for the interrupted subroutine 221 is stored in context memory 307 in the protected RSEG memory region 306. As previously noted, the RSEG region 306 is not writable by software processes in any processor mode (including platform firmware operating mode 232) after the initialization period, and is thus excluded from the set of hardware resources accessible to platform firmware operating mode 232, as listed in the security policy 308.

At block 415, the isolation management circuitry 230 instantiates an isolation layer 231 for executing the interrupt handler 233 in platform firmware operating mode 232. At block 417, the isolation management circuitry 230 causes the processor core 301 to execute the interrupt handler 233 in the isolation layer 231. If the interrupt 310 was caused by a failed I/O instruction 314, the processor core 301 during execution of the interrupt handler 233 addresses the cause of the failure (e.g., wakes the device 304 from the sleep state, as previously described), and asserts the I/O instruction restart register 309 to cause the operating system 220 to restart the I/O instruction 314 after the interrupt handler 233 is finished. The security policy 308 indicates that the I/O instruction restart register 309 is accessible to the platform firmware operating mode 232 so that the interrupt handler 233, which is a subroutine of the operating mode 232, is allowed to write to register 309.

At block 419, if the interrupt handler 233 has not attempted to access any of the hardware resources 303, the process 400 continues at block 435. At block 435, if the interrupt handler 233 has not finished, the process 400 returns to block 417 to continue executing the interrupt handler 233. At block 419, if the interrupt handler 233 attempts to access one or more of the hardware resources 303, the process 400 continues at block 421.

The isolation management circuitry 230 detects the attempted access of one of the hardware resources 303 and, at block 421, determines from the security policy 308 whether the access is allowed. At block 421, if the access is allowed, the process 400 returns to block 417. Execution of the interrupt handler 233 continues and the interrupt handler 233 accesses the hardware resource unimpeded.

At block 421, if the attempted access violates the security policy 308 (i.e., the type of access attempted is not listed in the security policy 308 for the hardware resource, or the hardware resource is excluded from the security policy entirely), then the process 400 continues at block 423. At block 423, the isolation management circuitry 230 intercepts and blocks the access attempt.

At block 425, the isolation management circuitry 230 performs a corrective action in response to the security violation. The corrective action corrects the cause of the security violation or facilitates correction by a different process. This can include recording information about the security violation, notifying a user or an audit service, reconfiguring the hardware resource (when the security violation results from misconfiguration of the hardware), etc.

At block 427, the processor core 301 resumes execution of the interrupt handler 233. After execution of the interrupt handler 233 has been resumed, the isolation management circuitry 230 communicates a security exception (e.g., #SX in x86 architectures) to the interrupt handler 233, as provided at block 429. At block 431, the interrupt handler 233 performs its own corrective action based on the security exception. If a graceful recovery from the security exception is not possible, then the interrupt handler 233 causes the system 100 to be reset, as provided at block 433. The reset can be achieved by powering off the system 100, cycling the power, or otherwise placing the system into a known state.

At block 431, if a graceful recovery from the event causing the security exception is possible, then the process 400 continues at block 435. From block 435, if the interrupt handler 233 is not finished (i.e., a resume instruction such as RSM has not been executed), then the processor core 301 continues executing the interrupt handler 233, at which time the interrupt handler 233 handles the security exception. Blocks 417-435 are performed as appropriate until the interrupt handler 233 is finished. At block 435, when the interrupt handler 233 is finished executing, the process 400 continues at block 437.

At block 437, the isolation management circuitry 230 deconstructs the isolation layer 231. At block 439, the isolation management circuitry 230 restores the previously saved context 311 from context memory 307 and returns control to the operating system subroutine 221 that was previously interrupted by the interrupt 310 via a resume instruction (e.g., the RSM instruction in x86 systems). The processor core 301 then continues executing the operating system subroutine 221 with the restored context 311, as provided at block 409. Due to the saving and restoring of context 311, the process of handling the interrupt 310 (corresponding to blocks 413-439) is transparent to the subroutine 221. Blocks 409-439 are repeated to handle any subsequently triggered interrupt events 310 during the execution of the operating system subroutine 221. Subroutines triggered by the interrupt 310 and operating in platform firmware operating mode 232 are thus isolated from physical hardware resources 303 of the computing system 100 through an isolation layer 231 provided by isolation management circuitry 230. By this approach, the isolation management circuitry 230 enforces the security policy 308 against processes running in platform firmware operating mode 232, preventing any malicious or misconfigured processes running in platform firmware operating mode 232 from exploiting its high levels of privilege to control hardware resources 303, operating system 220, and/or subroutines executed by the operating system 220.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
using isolation management circuitry to establish an isolated execution environment for execution of a platform firmware operating mode subroutine in a platform firmware operating mode;
in response to receiving an interrupt, performing the execution of the platform firmware operating mode subroutine in the isolated execution environment;
sending to the isolation management circuitry a hardware access request for attempting access of a hardware resource, the attempted access resulting from the execution of the platform firmware operating mode subroutine and,
in response to detecting the attempted access of the hardware resource, blocking the attempted access when the attempted access violates a security policy.

2. The method of claim 1, further comprising:
creating the security policy, wherein the security policy indicates an access permission for each hardware resource of a set of hardware resources in a computing system;
during an initialization period following a power-on reset of a processing unit in the computing system, storing the security policy in a protected memory region; and
after the initialization period, preventing modification of data in the protected memory region until after a subsequent power-on reset of the processing unit.

3. The method of claim 1, further comprising:
executing validation code for validating the security policy, wherein the validation code is authenticated by a Dynamic Root of Trust for Measurement (DRTM) procedure; and
in response to failing to validate the security policy by executing the validation code, at least partially restricting access to one or more hardware resources in a computing system, wherein validating the security policy comprises checking for a conflict between one or more access permissions indicated in the security policy and one or more operating system access permissions for the one or more hardware resources.

4. The method of claim 1, further comprising:
during the execution of the platform firmware operating mode subroutine, determining that the hardware resource is excluded from a set of accessible hardware resources indicated in the security policy, wherein the set of accessible hardware resources comprises at least one of a memory region in a computing system and a peripheral device in the computing system.

5. The method of claim 1, further comprising, in response to the detecting the attempted access of the hardware resource:
performing a corrective action; and
communicating a security exception to the platform firmware operating mode subroutine.

6. The method of claim 1, wherein:
the platform firmware operating mode is a system management mode (SMM) of an x86 processing unit;
the interrupt is a system management interrupt (SMI);
the platform firmware operating mode subroutine comprises an SMI handler; and
the method further comprises:
generating the interrupt in response to an I/O instruction issued by an operating system; and
during the execution of the platform firmware operating mode subroutine, asserting an instruction restart register to cause the operating system to restart the I/O instruction, wherein the security policy indicates that the instruction restart register is accessible to the platform firmware operating mode subroutine.

7. The method of claim 1, further comprising, in response to receiving the interrupt:
interrupting an operating system subroutine;
prior to the execution of the platform firmware operating mode subroutine, saving a context for the interrupted operating system subroutine; and
restoring the context for the operating system subroutine after halting the execution of the platform firmware operating mode subroutine.

8. The method of claim 1, further comprising:
prior to executing the platform firmware operating mode subroutine, removing data generated by an operating system subroutine from one or more registers to a protected memory region, wherein:
the one or more registers are included in a set of accessible hardware resources indicated in the security policy, and
the protected memory region is excluded from the set of accessible hardware resources.

9. A processing unit, comprising:
a processor core configured to: in response to receiving an interrupt, execute a platform firmware operating mode subroutine in an isolated execution environment, and
send to isolation management circuitry a hardware access request for attempting access of a hardware resource, the attempted access resulting from the execution of the platform firmware operating mode subroutine; and
the isolation management circuitry, configured to:
establish the isolated execution environment for the execution of the platform firmware operating mode subroutine in a platform firmware operating mode, and
in response to detecting the attempted access of the hardware resource resulting from the execution of the platform firmware operating mode subroutine, block the attempted access when the attempted access violates a security policy.

10. The processing unit of claim 9, wherein the isolation management circuitry comprises circuitry in ha same integrated circuit package as the processing core.

11. The processing unit of claim 9, wherein:
the processor core is an x86 processor core; and
the interrupt is a system management interrupt received at the processor core.

12. The processing unit of claim 9, further comprising:
a protected memory region coupled with the isolation management circuitry and configured to:
store the security policy during an initialization period following a power-on reset of the processing unit, wherein the security policy indicates an access permission for each hardware resource of a set of hardware resources in a computing system; and
after the initialization period, prevent modification of data in the protected memory region until after a subsequent power-on reset of the processing unit.

13. The processing unit of claim 9, wherein the processor core is further configured to:
execute validation code for validating the security policy, wherein the validation code is authenticated by a Dynamic Root of Trust for Measurement (DRTM) procedure; and
in response to failing to validate the security policy by executing the validation code, at least partially restrict access to one or more hardware resources in a computing system, wherein validating the security policy comprises checking for a conflict between one or more access permissions indicated in the security policy and one or more operating system access permissions for the one or more hardware resources.

14. The processing unit of claim 9, wherein:
the isolation management circuitry is further configured to, during the execution of the platform firmware operating mode subroutine, determine that the hardware resource is excluded from a set of accessible hardware resources indicated in the security policy, and
the set of accessible hardware resources comprises at least one of a memory region in a computing system, registers in a processing core of the computing system, and a peripheral device in the computing system.

15. The processing unit of claim 9, wherein:
the isolation management circuitry is further configured to, in response to the detecting the attempted access of the hardware resource:
perform a corrective action; and
communicate a security exception to the platform firmware operating mode subroutine.

16. The processing unit of claim 9, wherein:
the processor core is further configured to, in response to receiving the interrupt, interrupt execution of an operating system subroutine; and
the isolation management circuitry is further configured to:
prior to the execution of the platform firmware operating mode subroutine, save a context for the interrupted operating system subroutine, and
restore the context for the operating system subroutine after halting the execution of the platform firmware operating mode subroutine.

17. A computing system, comprising:
a set of hardware resources; and
a processing unit coupled with the set of hardware resources, wherein the processing unit is configured to:
use isolation management circuitry to establish an isolated execution environment for execution of a platform firmware operating mode subroutine in a platform firmware operating mode;

in response to receiving an interrupt, performing the execution of the platform firmware operating mode subroutine in the isolated execution environment;

send to the isolation management circuitry a hardware access request for attempting access of a hardware resource, the attempted access resulting from the execution of the platform firmware operating mode subroutine; and in response to detecting the attempted access of the hardware resource resulting from the execution of the platform firmware operating mode subroutine, block the attempted access when the attempted access violates a security policy.

18. The computing system of claim 17, wherein the processing unit is further configured to:

execute validation code for validating the security policy, wherein the validation code is authenticated by a Dynamic Root of Trust for Measurement (DRTM) procedure; and in response to failing to validate the security policy by executing the validation code, at least partially restrict access to the set of hardware resources, wherein validating the security policy comprises checking for a conflict between one or more access permissions indicated in the security policy and one or more operating system access permissions for the set of hardware resources.

19. The computing system of claim 17, wherein:

the processing unit is further configured to, during the execution of the platform firmware operating mode subroutine, determine that the hardware resource is excluded from a subset of the hardware resources indicated in the security policy as being accessible to the platform firmware operating mode subroutine; and the subset of the hardware resources comprises at least one of a memory region in the computing system, registers in a processing core of the computing system, and a peripheral device in the computing system.

20. The computing system of claim 17, wherein:

the processing unit is further configured to, in response to the detecting the attempted access of the hardware resource:

perform a corrective action; and communicate a security exception to the platform firmware operating mode subroutine.

* * * * *